United States Patent [19]
Ko

[11] Patent Number: 5,519,996
[45] Date of Patent: May 28, 1996

[54] BRAKE PEDAL STROKE DEPENDENT INCHING SYSTEM

[75] Inventor: Hyun G. Ko, Incheon, Rep. of Korea

[73] Assignee: Daewoo Heavy Industries Ltd., Incheon, Rep. of Korea

[21] Appl. No.: 365,626

[22] Filed: Dec. 28, 1994

[30] Foreign Application Priority Data

Dec. 28, 1993 [KR] Rep. of Korea .......... 93-30148

[51] Int. Cl.$^6$ .......... B60J 13/00; B60K 41/26
[52] U.S. Cl. .......... 60/547.1; 60/441; 192/4 A
[58] Field of Search .......... 60/435, 436, 441, 60/547.1, 547.2, 562; 91/461; 192/4 A

[56] References Cited

U.S. PATENT DOCUMENTS

| | | | |
|---|---|---|---|
| 4,006,805 | 2/1977 | Zeller et al. | 192/4 A |
| 4,093,051 | 6/1978 | Kreitzberg | 192/87.13 |
| 4,289,221 | 9/1981 | Chambers et al. | 192/3.57 |
| 4,317,331 | 3/1982 | Aruea et al. | 60/441 X |
| 4,579,200 | 4/1986 | Murakami et al. | 192/4 A |
| 4,598,545 | 7/1986 | Harada | 60/435 |
| 4,651,846 | 5/1987 | Headrick . | |
| 4,696,380 | 9/1987 | Kita | 192/4 A |
| 4,828,338 | 5/1989 | Ocvirk et al. | 60/547.1 X |

Primary Examiner—Hoang Nguyen
Attorney, Agent, or Firm—Lowe, Price, LeBlanc & Becker

[57] ABSTRACT

A inching system adapted for releasing a transmission clutch to disconnect engine power delivery in an industrial vehicle comprises a main pump for creating pump pressure; a brake pedal operated by a driver; a master cylinder communicating with the main pump through a pump pressure supply conduit for producing brake pressure in to perform a brake operation as the brake pedal is pressed; a charging pump for discharging clutch actuation fluid to be fed to the transmission clutch; an inching valve including a valve housing having a pilot chamber provided at a first end thereof to receive the pump pressure and a valve spool slidably fitted within the valve housing, the valve spool having a first operative position for feeding the clutch actuation fluid to the transmission clutch to engage the clutch and a second operative position for cutting off the clutch actuation fluid to release the transmission clutch when the pressure within the pilot chamber becomes higher than a predetermined valve; and a pilot conduit for interconnecting the pump pressure supply conduit and the pilot chamber.

5 Claims, 2 Drawing Sheets

5,519,996

BRAKE PEDAL STROKE DEPENDENT INCHING SYSTEM

FIELD OF THE INVENTION

The present invention is directed to a forklift truck and, more particularly, to an inching system adapted to engage or release a transmission clutch by way of controlling the position of an inching valve through the use of brake pressure which varies with the stroke of a brake pedal in a hydraulic booster brake device.

DESCRIPTION OF THE PRIOR ART

As is known in the art, an engine-driven forklift truck includes an automatic transmission whose clutch is operated by an inching valve. The inching valve is provided with a spool shiftable either to a clutch engagement position or to a clutch release position by virtue of hydraulic pressure or mechanical force.

With a typical inching system, the spool position is governed by brake pressure which in turn is fed from a master cylinder of the brake device. Accordingly, what is called "inching operation" and "brake operation" are simultaneously carried out by means of a single brake pedal. Such a hydraulically controlled inching system is said to be simple in structure and convenient to operate. Since at least a part of the brake pressure acting on vehicle wheels is used in operating the inching valve, however, idle stroke of the brake pedal tends to increase, thereby making the brake system unable to promptly respond to the brake pedal movement. This is particularly true when the brake pedal is suddenly worked under emergency situation.

U.S. Pat. No. 4,651,846 dated Mar. 24, 1987 discloses an inching system including a control valve for controlling the amount of hydraulic fluid, an orifice for constricting flow of the hydraulic fluid from a hydraulic source to the control valve and a variable inching valve for gradually reducing hydraulic pressure fed from the control valve to a forward-reverse valve. To perform the inching control by operating the variable inching valve, an additional inching pedal is required in the '846 patent, which would result in a complicated structure and a poor controllability.

SUMMARY OF THE INVENTION

It is an object of the invention to provide an inching system which can enable the inching operation and the brake operation to occur sequentially one after the other, while using only one brake pedal, and which has the ability to eliminate any idle stroke of the brake pedal.

To achieve the object noted above, the present invention provides an inching system adapted for releasing a transmission clutch to disconnect engine power delivery comprising: a main pump for generating pump pressure; a brake pedal operated by a driver; a master cylinder communicating with the main pump through a pump pressure supply conduit for producing brake pressure to perform a brake operation as the brake pedal is worked; a charging pump for discharging clutch actuation fluid to be fed to the transmission clutch; an inching valve including a valve housing and a valve spool slidably fitted within the valve housing, the valve housing having a pilot chamber provided at a first and thereof to receive the pump pressure, the valve spool shiftable between a first position for feeding the clutch actuation fluid to the transmission clutch to engage the transmission clutch and a second position for cutting off the clutch actuation fluid to release the transmission clutch when the pump pressure within the pilot chamber becomes higher than a predetermined value; and a pilot conduit for interconnecting the pump pressure supply conduit and the pilot chamber to enable the pump pressure to be supplied to the pilot chamber.

BRIEF DESCRIPTION OF THE DRAWINGS

Other objects, features and advantages of the invention will become apparent from the following description of the preferred embodiment taken in conjunction with the accompanying drawings in which.

DETAILED DESCRIPTION OF THE PREFERRED EMBODIMENTS

Figure 1:
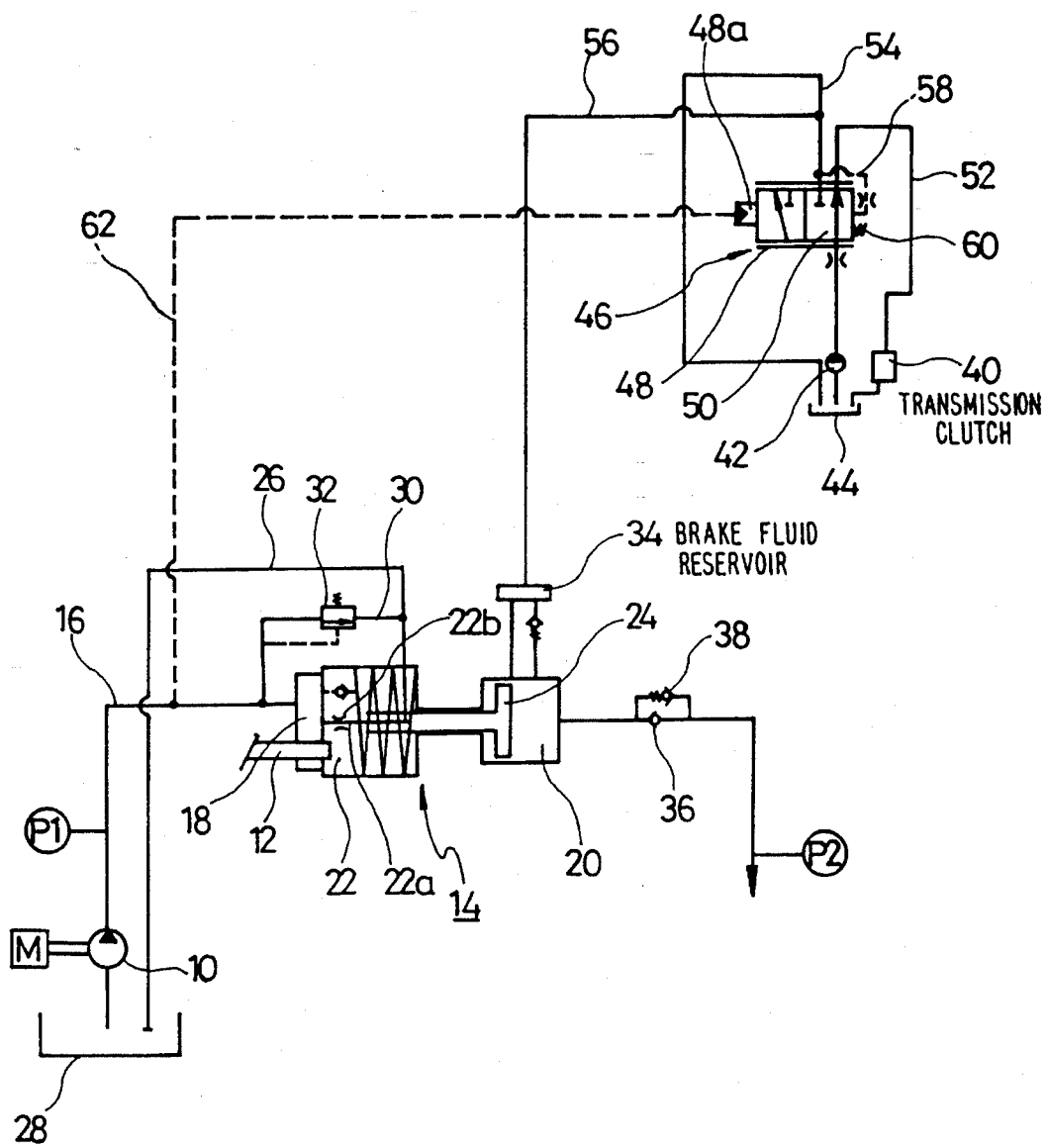
FIG. 1 is a schematic view showing a brake pedal stroke dependent inching system in accordance with a preferred embodiment of the present invention.
Figure 2:
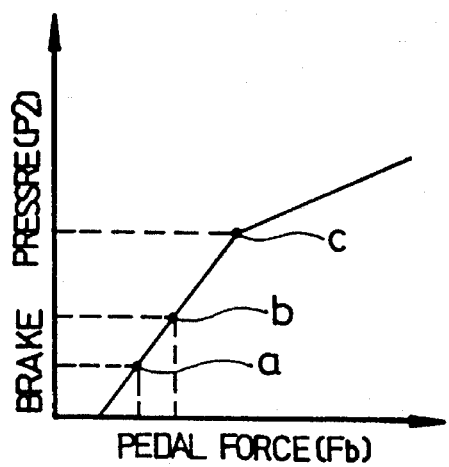
FIG. 2 illustrates the relationship of the pedal pressing force and the brake pressure.

Referring now to FIG. 1, there is shown a brake pedal stroke dependent inching system according to a preferred embodiment of the invention. The inching system is used for disconnecting engine power delivery by releasing a transmission clutch when a driver desires to brake industrial vehicles, e.g., a forklift truck. As long as the vehicle is in a normal drive state, namely, if there occurs no brake operation, the transmission clutch continues to remain engaged to transmit the rotary power created by an engire to vehicle wheels. In the illustrated embodiment, the inching system is designed to perform an inching operation by using, as a pilot pressure, the pump pressure P1 generated by a main pump 10. The inching operation is carried out in response to the driver's pressing a brake pedal 12 and the brake operation takes place immediately after the inching operation has been completed, to thereby reduce the vehicle speed. In other words, the inching operation and the brake operation is accomplished sequentially one after the other as the stroke of the brake pedal 12 is increased gradually.

A master cylinder 14 is adapted to produce brake pressure P2 in response to the increase of the stroke of the brake pedal 12 and then supply the brake pressure P2 to a wheel cylinder (not shown) to thereby brake the vehicle. To do this, the master cylinder 14 communicates with the main pump 10 through a pump pressure supply conduit 16. As shown in FIG. 1, the master cylinder 14, which is particularly adapted for use in a booster brake device, comprises a first chamber 18 for receiving the pump pressure P1 from the main pump 10, a second chamber 20 containing brake fluid therein, a first piston 22 slidably fitted within the first chamber 18, the first piston carrying the brake pedal 12 at one side thereof, and a second piston 24 connected to the other side of the first piston 22 and slidably fitted within the second chamber 20 for sliding movement along with the first piston 22.

The first piston 22 is provided with a pump pressure leakage channel 22a extending through the first piston 22 and a variable orifice 22b located somewhere along the channel 22a. The variable orifice 22b has an aperture area which may be progressively reduced to increase the pump pressure P1 as the stroke of the brake pedal 12 becomes greater. An outlet end of the pump pressure leakage channel 22a is connected through a drain pipe 26 with a reservoir 28. Furthermore, the pump pressure supply conduit 16 is coupled through a bypass pipe 30 to the drain pipe 26. A relief valve 32 is disposed on the bypass pipe 30 to prevent the pump pressure P1 from excessively increasing, by way of allowing the fluid in the pump pressure supply conduit 16 to return back to the reservoir 28 when the pump pressure P1 grows higher than a predetermined upper limit. The second chamber 20 of the master cylinder 14 is connected to a brake fluid reservoir 34; and a pair of check valves 36 and 38 are disposed at the downstream of the second chamber 20 to maintain residual pressure within a wheel cylinder (not shown).

As clearly shown in FIG. 1, the transmission clutch 40 may be engaged by a clutch actuation fluid fed from a charging pump 42 to transmit the engine power to the vehicle wheels. In case where the clutch actuation fluid is cut off, the transmission clutch 40 is released to disconnect the engine power delivery. The clutch actuation fluid used in engaging the transmission clutch 40 is collected in the oil tank 44 and then recirculated by the charging pump 42.

An inching valve 46 is employed for selectively supplying and cutting off the clutch actuation fluid to the transmission clutch 40. The inching valve 46 comprises a valve housing 48 having a pilot chamber 48a at its first end and a valve spool 50 slidably fitted within the valve housing 48. The valve spool 50 is shiftable between a first operative position for feeding the clutch actuation fluid to the transmission clutch 40 through a supply pipe 52 to thereby engage the clutch 40 and a second operative position for releasing the transmission clutch 40 by returning the clutch actuation fluid back to the oil tank 44 through a recovery pipe 54. The recovery pipe 54 is connected by a first branch pipe 56 with the brake fluid reservoir 34. Accordingly, when the valve spool 50 is in the second operative position, the clutch actuation fluid flowing through the recovery pipe 54 is at least partially fed to the brake fluid reservoir 34. The clutch apply fluid in the recovery pipe 54 is also partially supplied to a second end of the valve housing 48 through a second branch pipe 58, thereby biasing the valve spool 50 toward the first operative position.

At the second end of the valve housing 48, there is provided a compression spring 60 to normally urge the valve spool 50 of the inching valve 46 into the first operative position. The pilot chamber 48a of the valve housing 48 is connected through a pilot conduit 62 with the pump pressure supply conduit 16. This assures that the pump pressure P1 is fed to the pilot chamber 48a through the pilot conduit 62 to bias the valve spool 50 into the second operative position. When the pump pressure P1 acting on the pilot chamber 48a becomes higher than a predetermined value, the valve spool 50 shifted to the second operative position against the compression spring 60, whereas, when the pump pressure P1 is kept lower than the predetermined value, the valve spool 50 remains in the first position under the biasing force of the compression spring 60.

The operation of the inching system in accordance with the present invention will now be described in detail with reference to FIGS. 2 through 5.

Figure 3:
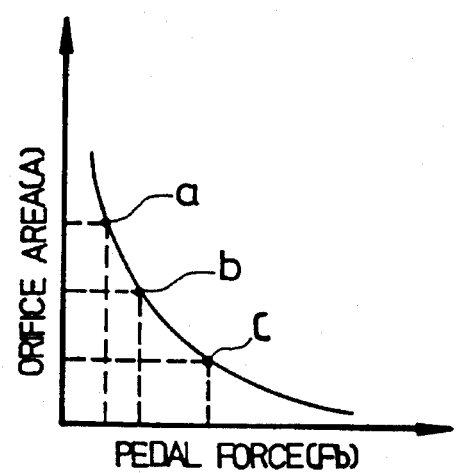
FIG. 3 a graphical illustration showing the relationship of the pedal pressing force and the aperture area of a variable orifice.
Figure 4:
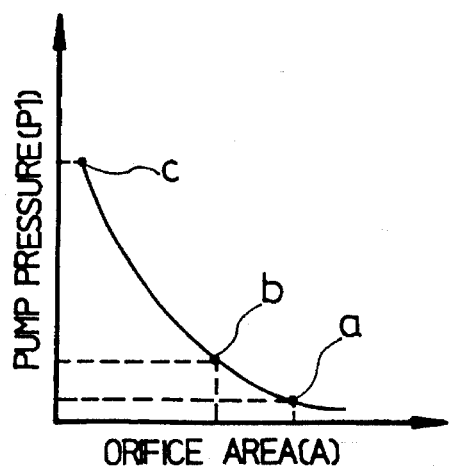
FIG. 4 is a graphical illustration depicting the relationship of the aperture area of the variable orifice and the pump pressure.
Figure 5:
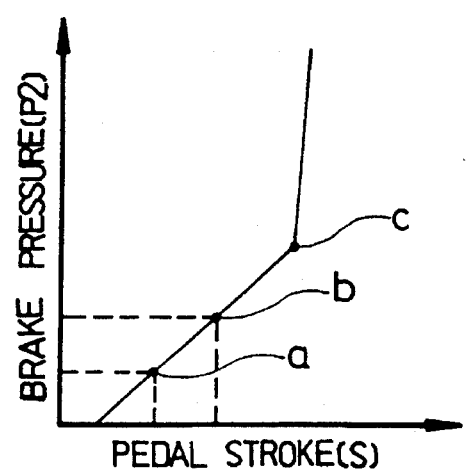
FIG. 5 is a graphical illustration showing the interrelation of the brake pedal stroke and the brake pressure.

As the driver exerts a pressing force Fb on the brake pedal 12, the aperture area A of the orifice 22b is gradually reduced in proportion to the pressing force Fb of the brake pedal 12 as shown in FIG. 3 and the pump pressure P1 is increased in reverse proportion to the aperture area A of the orifice 22b as shown in FIG. 4. Furthermore, the brake pressure P2 is increased in proportion to the pressing force Fb of the brake pedal 12. Interrelation of the stroke S of the brake pedal 12 and the brake pressure P2 is illustrated in FIG. 5.

As shown in FIG. 4, when the pump pressure P1 reaches point "c", the pressure acting on the pilot chamber 48a becomes equal to the biasing force of the compression spring 60; and, when the pump pressure P1 is further increased to point "b", the valve spool 50 of the inching valve 46 begins to be shifted toward the second operative position against the compression spring 60. As a result, the clutch actuation fluid created by the charging pump 42 is no longer fed to the transmission clutch 40 such that the transmission clutch 40 is released to thereby disconnect the engine power delivery. If the pump pressure P1 is further increased above point "b", the braking operation is then initiated to bring a brake shoe into contact with a brake lining in case of a shoe brake, for instance.

According to the inching system described above, point "b" of FIG. 4 serves as a demarcation point below which the inching operation takes place and above which the brake operation occurs. In other words, the transmission clutch 40 is completely released prior to initiation of the brake operation. Point "b" where the inching operation is terminated may be properly adjusted by varying the spring constant of the compression spring 60. In the event that the pump pressure P1 reaches point "c" in FIG. 4, the relief valve 32 is opened, such that the pump pressure P1 does not increase above the predetermined value.

Since then, when the pressing force is removed from the brake pedal 12, the first and second pistons 22 and 24 of the master cylinder 14 returns back to their rest position so that the aperture area A of the variable orifice 22b is progressively increased to thereby reduce the pump pressure P1. As the pump pressure P1 is reduced past point "b" in FIG. 4, the valve spool 50 of the inching valve 46 returns back to the first operative position by the compression spring 60, thus ensuring that the clutch actuation fluid is fed from the charging pump 42 to the transmission clutch 40.

While the invention has been shown and described with reference to a preferred embodiment, it should be apparent to those skilled in the art that many changes and modifications may be made without departing from the spirit and scope of the invention as defined in the claims.

What is claimed is:

1. An inching system adapted for releasing a transmission clutch to disconnect engine power delivery in an industrial vehicle, comprising:

a main pump for creating pump pressure;

a brake pedal operated by a driver;

a master cylinder communicating with the main pump through a pump pressure supply conduit for producing brake pressure to perform a brake operation as the brake pedal is pressed;

a charging pump for discharging clutch actuation fluid to be fed to the transmission clutch;

an inching valve including a valve housing having a pilot chamber provided at a first end thereof to receive the pump pressure and a valve spool slidably fitted within the valve housing, the valve spool shiftable between a first operative position for feeding the clutch actuation fluid to the transmission clutch to engage the clutch and a second operative position for cutting off the clutch actuation fluid to release the transmission clutch when the pressure within the pilot chamber becomes higher than a predetermined value; and a pilot conduit for interconnecting the pump pressure supply conduit and the pilot chamber.

2. The inching system as recited in claim 1, wherein the master cylinder comprises a first chamber communicating with the main pump, a second chamber containing brake fluid, a first piston slidably fitted within the first chamber and carrying the brake pedal attached at one side thereof and, a second piston connected to the other side of the first piston and slidably fitted within the second chamber.

3. The inching system as recited in claim 2, wherein the first piston is provided with a pump pressure leakage channel extending through the first piston and a variable orifice disposed on the leakage channel, the variable orifice having an aperture area which is progressively reduced to increase the pump pressure as the brake pedal is pressed.

4. The inching system as recited in claim 1, further comprising a spring provided at a second end of the valve housing to urge the valve spool to the first operative position when the pump pressure acting on the pilot chamber remains lower than the predetermined value.

5. The inching system as recited in claim 4, wherein the clutch actuation fluid is fed to the second chamber of the master cylinder through a branch pipe when the valve spool is in the second operative position.

* * * * *